United States Patent [19]
De Moer et al.

[11] Patent Number: 6,147,968
[45] Date of Patent: Nov. 14, 2000

[54] METHOD AND APPARATUS FOR DATA TRANSMISSION IN SYNCHRONOUS OPTICAL NETWORKS

[75] Inventors: Evert De Moer; Peter Phelps; Bruce Dunn, all of Nepean; Gary L. Swinkels, Ottawa; Louis-René Pare, St. Bruno, all of Canada

[73] Assignee: Nortel Networks Corporation, Montreal, Canada

[21] Appl. No.: 09/169,999

[22] Filed: Oct. 13, 1998

[51] Int. Cl.[7] .............................. H04L 12/26; H04L 12/56
[52] U.S. Cl. ........................ 370/225; 370/392; 370/406
[58] Field of Search ............................ 370/216, 217, 370/218, 219, 220, 221, 222, 223, 225, 226, 227, 228, 389, 392, 406, 407, 428, 360

[56] References Cited

U.S. PATENT DOCUMENTS

| | | |
|---|---|---|
| 5,526,349 | 6/1996 | Diaz et al. |
| 5,568,486 | 10/1996 | Huscroft et al. .................. 370/395 |
| 5,784,377 | 7/1998 | Baydar et al. |
| 5,949,791 | 9/1999 | Byers et al. ........................ 370/466 |

OTHER PUBLICATIONS

European Search Report EP 99 30 8084, Jan. 28, 2000.

*Primary Examiner*—Chi H. Pham
*Assistant Examiner*—Kwang B. Yao

[57] ABSTRACT

The present invention relates to a switching node for use in a synchronous optical network ring, where the ring is transporting data divided into first size blocks, for example OC-192 optical signals, characterized by data blocks of size 192. The switching node includes several primary receive and send connections, for receiving and transmitting inter-ring optical signals divided into second size blocks, for example OC-48 optical signals, characterized by data blocks of size 48. The switching node further includes a secondary receive and send connection for receiving and transmitting intra-ring optical signals divided into first size blocks. A critical component of the switching node is the main controller, responsible for routing incoming intra-ring first size blocks towards a primary send connection. The main controller divides a first size block into smaller second size blocks, observes the second size blocks for the presence of concatenated data and, in the case where there is presence of concatenated data, routes the second size block as a single unit towards the adjacent network ring. In the case where there is absence of concatenated data, the routing controller routes the group of data forming the second size block as independent data elements towards the adjacent network ring.

21 Claims, 7 Drawing Sheets

METHOD AND APPARATUS FOR DATA TRANSMISSION IN SYNCHRONOUS OPTICAL NETWORKS

FIELD OF THE INVENTION

The present invention relates to the field of data transmission, such as data transmission that may occur in synchronous optical networks. More particularly, it pertains to a method for switching concatenated signals between different optical network rings.

BACKGROUND OF THE INVENTION

Within the ever evolving telecommunications industry, the advent of numerous independent, localized networks has created a need for reliable inter-network communication. Unfortunately, this inter-network communication is difficult to accomplish in a cost effective manner due to differences in the digital signal hierarchies, the encoding techniques and the multiplexing strategies. Transporting a signal to a different network requires a complicated multiplexing/demultiplexing, coding/decoding process to convert the signal from one scheme to another scheme. A solution to this problem is SONET, an acronym for Synchronous Optical NETwork. It is an optical transmission interface, specifically a set of standards defining the rates and formats for optical networks. Proposed by Bellcore during the early 80s and standardized by ANSI, SONET is compatible with Synchronous Digital Hierarchy (SDH), a similar standard established in Europe by ITU-T. SONET offers a new system hierarchy for multiplexing over modern high-capacity fiber optic networks and a new approach to Time Division Multiplexing (TDM) for small traffic payloads. SONET has several advantages, including:

- meeting the demands for increased network Operation and Maintenance (OAM) for vendors and users by integrating the OAM into the network, thus reducing the cost of transmission;
- standardizing the interconnection between different service providers (Mid-Span Meet);
- allowing the adding and/or dropping of signals with a single multiplexing process, as a result of SONET's synchronous characteristic.

The Synchronous Transport Signal (STS) frame is the basic building block of SONET optical interfaces, where STS-1 (level 1) is the basic signal rate of SONET. Multiple STS-1 frames may be concatenated to form STS-N frames, where the individual STS-1 signals are byte interleaved. The STS frame comprises two parts, the STS payload and the STS overhead. The STS payload carries the information portion of the signal, while the STS overhead carries the signaling and protocol information. This allows communication between intelligent nodes within the network, permitting administration, surveillance, provisioning and control of the network from a central location. At the ends of a communication system, signals with various rates and different formats must be dealt with. A SONET end-to-end connection includes terminating equipment at both ends, responsible for converting a signal from the user format to the STS format prior to transmission through the various SONET networks, and for converting the signal from STS format back to the user format once transmission is complete.

SONET is a four layer system hierarchy, with each layer building on the services provided by the lower layers. Each layer communicates to peer equipment in the same layer, processes information and passes it up and down to the next layer. The path layer ensures the end-to-end transport of user data at the appropriate signaling speed, mapping services (such as DS1, DS2, DS3 and video) and path overhead into Synchronous Payload Envelopes (SPEs). The line layer multiplexes and synchronizes the SPEs and adds line overhead to form STS-N combined signals. The section layer performs scrambling and framing, and adds section overhead, in order to create SONET frames. Finally, the photonic layer is the SONET physical layer, converting electrical signals into optical ones and transmitting these to distant nodes. At the distant nodes, the process is reversed, starting with the photonic layer, whereby the optical signal is converted to an electrical signal and passed down to the path layer where the different service signals terminate. The optical form of the STS signals are called Optical Carriers (OCs). The STS-1 signal and the OC-1 signal have the same rate.

The SONET line rate is a synchronous hierarchy that is flexible enough to support many different capacity signals. The STS-1/OC-1 line rate was chosen to be 51.84 Mbps to accommodate 28 DS1 signals and 1 DS3 signal. The higher level signals are obtained by synchronous multiplexing of the lower level signals. This higher level signal can be represented by STS-N or OC-N, where N is an integer. Currently the values of N are 1, 3, 12, 48 and 192. For example, OC-48 has a rate of 2488.320 Mbps, 48 times the rate of OC-1. SONET is also capable of handling signals that are at a lower rate than the STS-1 signal, referred to as sub-STS-1 signals. Specific to SONET, the sub-STS-1 signal is referred to as a Virtual Tributary (VT), where the VT structure is designed for transporting and switching sub-STS-1 signals. There are four types (sizes) of VTs, specifically VT-6, VT-3, VT-2 and VT-1.5, each size designed to accommodate a certain size of digital signal, respectively DS2 (6.312 Mbps), DS1C (3.152 Mbps), CEPT-1 (2.048 Mbps) and DS1 (1.544 Mbps).

Since an optical cable is capable of transmitting very high data rates, it is logical to multiplex multiple STS-1 signals to fully utilize the network capacity. Such multiplexing is required to provide super rate services such as BISDN. In the SONET synchronous environment, multiple STS-1 signals are traveling together at a higher rate, but are still visible as individual STS-1 signals as a result of the interleaving process. For the purposes of this specification, interleaving is a procedure for interlacing the individual bytes of a signal such that each component signal is visible within the combined signal. This eliminates the necessity for complete demultiplexing of an STS-N signal in order to access a single STS-1 signal.

Existing optical networks are formed by several interconnected rings, each ring formed itself by several nodes connected to one another. Two rings may be simply interconnected via a line connection between one node from each ring. Unfortunately, this inter-ring connection may fail as a result of either a node failure, a line failure, a path failure or a channel failure, all situations resulting in a loss of traffic within the network. A channel failure consists in a failure of one of the multiple signal channels, for instance one of the 12 STS-1 channels forming an OC-12c. A path failure consists in a failure of one of the two paths forming a send-receive connection between two transmission nodes within the optical network. A line failure consists in a failure of the fiber optic line, and thus of the entire signal.

A solution to this inter-ring connection failure problem is to provide protection switching, whereby a secondary connection between rings establishes an alternate route of transmission. Within this network structure, nodes establishing a primary connection between rings have the capability to route data over a secondary connection in the case of a primary node, line or channel failure. This network solution, commonly referred to as Matched Nodes, is currently in use within optical networks and is compliant to Bellcore's GR1230 requirements. The Matched Nodes approach provides a mechanism to protect one STS-1 channel, as the inter-ring switching only takes place at this facility level, and can be used between any two types of rings, such as an OC-12, OC-48 or OC-192 ring, among others.

Unfortunately, the Matched Nodes approach is limited to protecting a single STS-1 channel at a time. Progressively, more and more optical network customers are asking for the transmission of concatenated payloads, which conflicts with the Matched Nodes requirements. Another limitation of the Matched Nodes approach is the time required to execute a protection switch between inter-connected rings. A 100 msec hold-off time is applied before every protection switch, whether an intra-ring path, inter-ring line or inter-ring path failure has occurred. Also, in the case of large payload transmission whereby only one STS-1 signal can be switched at a time, the processing time of a protection switch between rings may become larger than the time required as per the Bellcore specifications. For example, in the case of an OC-48c optical signal, 48 OC-1 service selectors would have to switch.

The background information provided above clearly indicates that there exists a need in the industry to provide a method and apparatus for concatenated payload transmission in synchronous optical networks.

OBJECTS AND STATEMENT OF THE INVENTION

An object of this invention is to provide a novel switching node for use in an optical network capable of performing optical signal concatenated payload transmission within and between synchronous optical network rings.

Another object of this invention is to provide a method for managing data transmission in a synchronous optical network, capable to support the inter-ring transmission of optical signals carrying concatenated payloads.

As embodied and broadly described herein, the invention provides a switching node for use in a synchronous optical network ring transporting data divided into first size blocks, said switching node including:

a plurality of primary receive connections for receiving inter-ring optical signals divided into second size blocks, where a second size block is smaller than a first size block, a second size block including a header section and a payload section, the header section including a mark related to at least a portion of the payload section, the mark being indicative as to whether the portion of the payload section is concatenated data or non concatenated data, when the portion of the payload section is non concatenated data it includes a plurality of independent data elements;

a plurality of primary send connections for transmitting inter-ring optical signals divided into second size blocks;

a secondary receive connection for receiving intra-ring optical signals divided into first size blocks;

a secondary send connection for transmitting intra-ring optical signals divided into first size blocks;

a routing controller for routing of first size blocks towards the primary send connections, said routing controller being operative to:

a) divide an incoming first size block into at least two second size blocks;

b) observe the mark in the header section of a second size block to determine whether the payload section of the second size block includes concatenated data and acquiring either one of two data transmission modes in dependence of the mark;

i) If the mark is indicative of presence of concatenated data in the payload section of the second size block, said routing controller acquires a first data transmission mode where the concatenated data is routed as a single unit towards a particular primary send connection; and ii) If the mark is indicative of absence of concatenated data in the payload section of the second size block, said routing controller acquires a second data transmission mode permitting routing of independent data elements contained in the payload section of the second size block towards different primary send connections.

In a specific example, the switching node is one component of a synchronous optical network, where this network comprises two inter-connected rings, themselves inter-connecting two remote telephone instruments (also referred to as Customer Premises Equipment (CPE). The telephone instruments are therefore the end-points for a SONET connection. Alternatively, the end-points for the SONET connection could be the modems of two remote computers. Both rings are OC-192 rings, where the optical signal being transmitted within each ring is an OC-192. Alternatively, rings of various types may also be connected, for example an OC-48 ring and an OC-192 ring.

For the purposes of this specification, an OC-192 optical signal will be referred to as a signal characterized by a block size of 192. Similarly, an OC-48 optical signal is characterized by a block size of 48, while an OC-12 optical signal is characterized by a block size of 12. As described above, each optical signal block includes a header section and a payload section. The header section includes a mark, for example a field which is either set or cleared, related to at least a portion of the optical signal block's payload section. The mark characterizes this portion as being either concatenated or non-concatenated data. A portion of non-concatenated data is considered to be a grouping of independent data elements, able to be processed and routed through the network independently, as opposed to concatenated data which must be routed as a single unit.

In a specific example, two SONET rings are inter-connected by at least four lines. Two of these lines support a primary send and receive connection between the two rings, each line being dedicated to one direction of traffic flow. Similarly, the other two lines participate in secondary send and receive connections between the two rings. Such secondary send and receive connections involve other nodes on the network. The two nodes (one from each ring) inter-connected by the primary connection are referred to as primary or switching nodes, while the two nodes inter-connected by the secondary connection are referred to as secondary nodes. The number of primary and secondary connection lines is dependent on the number of tributaries implemented on the primary and secondary nodes, as will be described in more detail below. These primary and secondary connections and nodes ensure protection switching between the SONET rings. The term "protection switching" implies that in the case of a node, channel or line failure impeding the connection between the two rings, an alternate route, or secondary connection, is available to support the transfer of traffic between rings. Although a secondary connection has been described as supporting an inter-ring connection between two adjacent ring's secondary nodes, a particular ring's switching node also includes a secondary send and receive connection to support an intra-ring path between itself and the particular ring's secondary node.

Preferably, the inter-ring protection switching is executed at the OC-12 or OC-48 facility level, as opposed to existing Matched Nodes systems where the switching takes place at the STS-1 level, thereby significantly improving the quality and duration of data transmission within the optical network. Specifically, the improvement in data transmission arises from the novel support of concatenated payloads, such as OC-12c or OC-48c optical signals. Since concatenated payloads includes a bundle of signals which must all be routed together through the network as a single unit, the present invention supports protection switching for an entire concatenated signal at one time.

In a preferred embodiment, the primary or switching node is structurally comprised of several interfaces, a controller and a memory. An internal system bus interconnects these components, enabling data and control signals to be exchanged between them. The interfaces interconnect various input and output ports to their respective physical paths, including intra-ring working and protection paths, inter-ring primary connections and intra-ring secondary connections.

Each intra-ring send and receive pair of working paths is implemented by a fiber pair, while each intra-ring send and receive pair of protection paths is implemented by a separate fiber pair. These pairs are never in the same fiber optic cable, as this would defeat the purpose of protection against cable breaks. The inter-ring primary send and receive connection lines, as well as the intra-ring secondary send and receive connection lines, are also implemented by another fiber pair. The input/output port pair for a send and receive pair of inter-ring primary connection lines form what is called a primary connection tributary, receiving data from, and transmitting data to, an adjacent ring's primary node. In a specific embodiment of this invention, such a tributary may support either the OC-12 or OC-48 level. In the case of an OC-192 switching node, the node would include either 4 OC-48 tributaries, and consequently 4 pairs of OC-48 primary inter-ring send/receive connections, or 16 OC-12 tributaries, and consequently 16 pairs of OC-12 primary inter-ring send/receive connections.

The memory contains a program element that controls the operation of the switching node. This program element is comprised of individual instructions that are executed by the controller that is in the form of a Central Processing Unit (CPU). In addition, the memory provides random access storage, capable of holding data elements that the controller manipulates during the execution of the program. For all transmission nodes within SONET rings, the execution of the program element by the controller ensures standard data transmission and error/failure monitoring, including the multiplexing and de-multiplexing of optical signals as well as the support of both linear and ring protection. Specific to the present invention, the execution of the program element stored in the memory of an OC-192 switching node further ensures the handling and inter-ring transmission of optical signal concatenated payloads, as well as protection switching between the inter-connected SONET rings.

Functionally speaking, the program element implements two sub-controller functional blocks, specifically a routing controller functional block (or simply "routing controller") and a switching controller functional block (or simply "switching controller"). In a specific example, the routing controller is responsible within the switching node for routing an incoming intra-ring optical signal of block size 192 to an adjacent network ring, via the inter-ring primary send connection. In order to do so, the routing controller first divides the intra-ring OC-192 optical signal it receives into the smaller size blocks such as either 4 optical signals of block size 48, or 16 optical signals of block size 12, dependent on the optical signal level supported by the switching node tributaries. Following this division, the routing controller next observes the smaller size blocks one at a time and determines whether a particular block is to be transmitted to an adjacent ring. Note that in the case where the block is not to be transmitted to an adjacent ring, it is to be transmitted either to an external system or to another transmission node internal to the same ring. Specific to the case where a particular block is to be transmitted to an adjacent ring, the routing controller reads the block's header section for a mark indicative of concatenated or non-concatenated data within the block's payload section. If this mark indicates concatenated data, the routing controller will route this data to the adjacent network ring as a single unit, via a particular primary inter-ring send connection. This is done because the concatenated data cannot be split. If, on the other hand, the mark indicates the absence of concatenated data, the routing controller will permit the block's payload to be routed to the adjacent network ring as independent data elements, via different primary inter-ring send connections. In other words, the independent data elements that can be STS-1 level signals can be routed through different primary inter-ring send connections. This is possible since the data elements are independent entities that do not need to be processed globally as a unit.

Further, the routing controller is responsible for implementing a dual transmission, whereby a copy of a particular optical signal of block size 12 or 48, to be transmitted over a primary send connection to an adjacent ring, is multiplexed into an optical signal of block size 192 and routed towards the intra-ring secondary send connection. This copy provides a data backup in case a particular primary send connection experiences a failure and one of the smaller size blocks divided out from an OC-192 optical signal is routed towards this particular primary send connection. Without the data backup, the smaller size block(s) routed towards the particular primary send connection would be lost. This routing controller functionality is implemented as software, specifically a part of the program element stored in the memory of the switching node.

The switching controller itself is responsible for monitoring the primary inter-ring receive connections for the presence of a failure, where such a failure could result in the loss of inter-ring data incoming from the adjacent ring. In the case where a failure is detected at a particular primary receive connection, the switching controller will perform a protection switch, to be described below. In simple terms, the protection switch involves receiving the incoming inter-ring data from the intra-ring secondary receive connection, as opposed to the failed primary receive connection. Similar to the routing controller, the switching controller functionality is implemented as software, specifically a part of the program element stored in the memory of the switching node.

The protection switching functionality inherent to an OC-192 primary node, also implemented in software as a part of the program element stored in the switching node's memory, includes two functional components, specifically a Service Selector and a Drop and Continue Point. It is the combined functionality of both the Service Selector and the Drop and Continue Point within the switching node which allows for a secondary connection, or alternate route, to be established between two SONET rings, as required by protection switching. Within a switching node, the Service Selector, part of the switching controller, is responsible for receiving the incoming data from another ring, selecting either the switching connection between the two rings or, in the case of an inter-ring failure of some sort, the working path from the appropriate adjacent secondary node. The Drop and Continue Point of a switching node, part of the routing controller, is responsible for backing-up any transmission made over the switching connection to another ring, whereby the same transmission is sent over a working path to the appropriate adjacent secondary node. In a most preferred embodiment, within each switching node there is one Service Selector and one Drop and Continue Point for each primary inter-ring connection tributary. In the case where an OC-192 switching node includes 4 OC-48 tributaries, there would also be 4 Service Selectors and 4 Drop and Continue Points, each capable of processing a maximum of 48 STS-1 signals at a time. In the case where an OC-192 switching node includes 16 OC-12 tributaries, there would also be 16 Service Selectors and 16 Drop and Continue Points, each capable of processing a maximum of 12 STS-1 signals at a time.

In a specific example, each OC-192 switching node is responsible for verifying its outgoing and incoming lines, capable of detecting failures within its own SONET ring, as well as at the connections to other SONET rings. This verification may be effected by constantly monitoring incoming lines for failures that indicate a loss of data. Examples of these failures are Loss of Signal, Loss of Pointer, Line Alarm and Path Alarm. These failures are reported in the SONET overhead, and they are the same failures that will cause a linear protection switch or a ring protection switch. In the case where this verification reports such a failure at a primary connection, a protection switch occurs and the switching node collects inter-ring traffic from the intra-ring secondary connection, specifically over a pre-determined incoming working path within its own SONET ring. No verification is performed by the primary node on its outgoing line to a primary connection since any transmission sent over this line is also sent over an intra-ring working path towards the ring's secondary node, used as a back-up in the case of an inter-ring line or switching node failure.

Note that the present invention exhibits fast recovery of inter-ring traffic in the case of inter-ring line failures. In existing Matched Nodes systems, a hold-off time of 100 msec is applied before all protection switches are executed, whether an inter-ring line, inter-ring path or intra-ring path failure has occurred. In a specific example, this hold-off time is applied in the case of path failures only. The hold-off time is necessary in the case of path failures because a switching node's service selector may detect a signal failure for a brief duration (up to 60 msec) while a subtending equipment does a protection switch, and may consequently execute an unnecessary protection switch. However, the hold-off time is not applied in the case of an inter-ring line failure, since a line failure indicates a primary inter-connection feed failure. Such a failure requires a protection switch in order to avoid loss of traffic, as it may not be corrected by a prior protection switch in any subtending equipment. Therefore, a line failure will result in a protection switch as soon as possible. This distinction between the different failures detected within the subtending equipment of an optical network, and the specific hold-off time applied as a result, allows for an overall faster recovery of inter-ring traffic, due to the faster switching time implemented in the wake of all detected line failures.

As embodied and broadly described herein, the invention also provides a method for managing the transmission of optical signal concatenated payloads in a switching node of a synchronous optical network ring transporting data divided into first size blocks, said switching node including:

a plurality of primary receive connections for receiving inter-ring optical signals divided into second size blocks, where a second size block is smaller than a first size block, a second size block including a header section and a payload section, the header section including a mark related to at least a portion of the payload section, the mark being indicative as to whether the portion of the payload section is concatenated data or non concatenated data, when the portion of the payload section is non concatenated data it includes a plurality of independent data elements;

a plurality of primary send connections for transmitting inter-ring optical signals divided into second size blocks;

a secondary receive connection for receiving intra-ring optical signals divided into first size blocks;

a secondary send connection for transmitting intra-ring optical signals divided into first size blocks;

said method comprising the steps of:
 a) receiving an incoming first size block;
 b) dividing said first size block into at least two second size blocks, where a second size block includes a header section and a payload section;
 c) processing a second size block to determine whether the payload section of said second size block includes concatenated data;
 d) routing the second size block towards an adjacent optical network ring in dependence of the presence of concatenated data, if there is presence of concatenated data said concatenated data is routed as a single unit towards a particular primary inter-ring connection, if there is absence of concatenated data the data contained in said payload section of the second size block may be routed as independent data elements towards different primary inter-ring connections.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DESCRIPTION OF A PREFERRED EMBODIMENT

Figure 1:
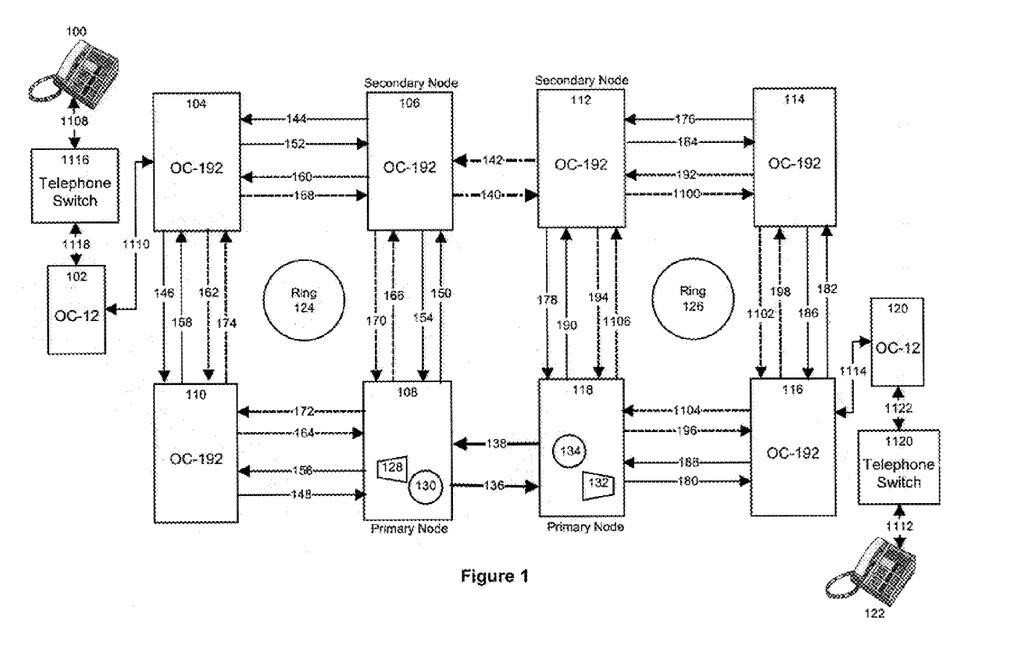
FIG. 1 is a block diagram of an optical network including a plurality of rings, connected to one another, in accordance with this invention.

FIG. 1 illustrates an example of a situation where two remote telephones 100 and 122 are connected via a synchronous optical network. The telephones are therefore the end-points for a SONET connection, where the optical network is in this example formed by two inter-connected rings 124 and 126. Alternatively, the end-points for the SONET connection could be the modems of two remote computers, while the network itself could include several more rings.

As described above, current SONET standards support the transmission of OC-1, OC-3, OC-12, OC-48 and OC-192 optical signals. In a specific embodiment of this invention, both ring 124 and ring 126 are OC-192 rings, where the optical signal being transmitted is an OC-192. Alternatively, rings of various types may also be inter-connected, for example an OC-48 ring and an OC-192 ring. For the purposes of this specification, an OC-192 optical signal will be referred to as being characterized by a block size of 192. Similarly, an OC-48 optical signal is characterized by a block size of 48, while an OC-12 optical signal is characterized by a block size of 12. Each optical signal block includes a header section and a payload section. The header section includes a mark, for example a field which is either set or cleared, related to at least a portion of the optical signal block's payload section. The mark characterizes this portion as being either concatenated or non-concatenated data. A portion of non-concatenated data is simply considered to be a grouping of independent data elements, able to be processed and routed through the network independently, as opposed to concatenated data which is routed as a single unit. It should be noted that in the case where the payload section is either concatenated or non-concatenated data, a single mark in the header section will suffice. In this case the mark indicates whether the entire payload section is con-catenated or non-concatenated. For more flexibility, the payload section may be fragmented, each part being associated with a given mark in the header section. Thus, the header section includes several marks and each part of the payload section may be concatenated or non-concatenated. This characteristic allows hybrid payload section blocks, having concatenated data and non-concatenated data portions.

In FIG. 1, each OC-192 ring is formed by several transmission nodes, also referred to as OC-192 nodes. Specific to this example, transmission nodes 104, 106, 108 and 110 form ring 124, while transmission nodes 112, 114, 116 and 118 form ring 126. Each of these nodes can receive an externally created OC-12 or OC-48 optical signal, and multiplex those into an OC-192 optical signal for transmission within rings 124 and 126. Similarly, each of these transmission nodes can de-multiplex an OC-12 or OC-48 optical signal from an intra-ring OC-192 optical signal for transmission external to the rings. The OC-12 or OC-48 signal originates from and is transmitted to an external OC-12 or OC-48 system that itself transmits and receives electrical signals. In the example of FIG. 1, a call from phone 100 is sent over the electrical line 1108 to a telephone switch 1116. This switch routes the call and multiplexes 24 such calls, all arriving from different points of origin, into a single electrical signal, known as a DS1. The DS1 is then sent over another electrical line 1118 to an OC-12 node 102, where a maximum of 336 DS1 signals are multiplexed into one OC-12 optical signal. Next, the OC-12 optical signal is sent over a fiber 1110 to an OC-192 node 104. This OC-192 node 104 can multiplex 16 such OC-12 signals into a single OC-192 signal, which represents approximately 130 000 voice calls. The OC-192 optical signal is routed through the optical network, from transmission node to transmission node, until it reaches the receiving OC-192 node, where it is de-multiplexed into 16 OC-12 optical signals. The above process then repeats itself in reverse order, until the original voice call is transmitted over an electrical line to the destination party's phone. As both the telephone switch and the OC-12 nodes are well known to those skilled in the art, and are not critical to the success of this invention, they will not be described in further detail.

Within each ring, two adjacent nodes are inter-connected by two working paths, one for each direction of traffic flow, implemented by a fiber pair. Two additional protection paths, implemented by another fiber pair, also connect the two nodes, ensuring span protection of the working paths. The term "span protection", also referred to as "linear protection" when not dealing with a ring implementation, implies that in the case of a working path failure (possibly due to a fiber cut), the protection path can be used as a backup for traffic transmission. In FIG. 1, note that within ring 124, nodes 104 and 106 are adjacent and inter-connected by four paths. Paths 144 and 152 are the working paths, while paths 160 and 168 are their respective protection paths. In the case where data is being sent from node 106 to node 104, the working path 144 is the first choice transmission path. However, if the working path 144 is non-functional, the protection path 160 assumes transmission duties. This distribution of transmission duty is identical for paths 152 and 168, as well as for all other pairs of working and protection paths inter-connecting two adjacent SONET transmission nodes seen in FIG. 1.

Further to span protection, each SONET ring also supports ring protection, whereby if a node, path or line failure occurs within a ring, an alternate route will be used in order to ensure traffic flow. For example, assume that uni-directional traffic is to flow from node 104 to node 108, specifically over working paths 146 and 148. However, due to line failures between nodes 110 and 108 (both working and protection paths are non-functional), the transfer of traffic from node 110 to node 108 is impossible. In such a case, ring protection ensures that traffic arriving at node 110 is re-routed to node 104 over protection path 174, at which point the traffic is sent to node 108 via node 106, over protection paths 168 and 170. Therefore, no traffic loss occurs within the ring 124. A similar scenario takes place in the case of a node failure.

In a most preferred embodiment of this invention, the two rings 124 and 126 are inter-connected by four lines. Lines 136 and 138 join nodes 108 and 118, each line supporting one direction of traffic flow, and terminate in either a primary send or a primary receive connection for each node. Similarly, lines 140 and 142 join nodes 106 and 112, and terminate in either a secondary send or a secondary receive connection for each node. Consequently, nodes 108 and 118 are referred to as primary or switching nodes, while nodes 106 and 112 are referred to as secondary nodes. These primary and secondary connections and nodes ensure protection switching between the SONET rings, and will be described in more detail below. Note that the term "connection" refers simply to a point at which a path and a switching node interact. The term "protection switching" implies that in the case of a node, channel or line failure impeding the connection between rings 124 and 126, an alternate route, or secondary connection, is available to support the transfer of traffic between rings. Although a secondary connection has been described as supporting an inter-ring line between two adjacent ring's secondary nodes, a particular ring's switching node also includes a secondary send and receive connection to support an intra-ring path between itself and the particular ring's secondary node, for example over working lines 150 and 154.

The inter-ring protection switching can be effected at the OC-12 or OC-48 facility level, as opposed to existing Matched Nodes systems where the switching takes place at the basic STS-1 level, thereby significantly improving switching times, and therefore the quality of data transmission within the optical network. Specifically, the improvement in data transmission arises from the novel support of concatenated payloads, such as OC-12c or OC-48c optical signals. Since concatenated payloads consist in a bundle of signals that must all be routed together through the network as a single unit, the present invention supports protection switching for an entire concatenated signal at one time. Note that a primary node may also be a secondary node, and vice versa, in the case where more than two SONET rings are inter-connected. The flow of traffic between the two rings 124 and 126 as a result of protection switching will also be described in more detail below.

Figure 2:
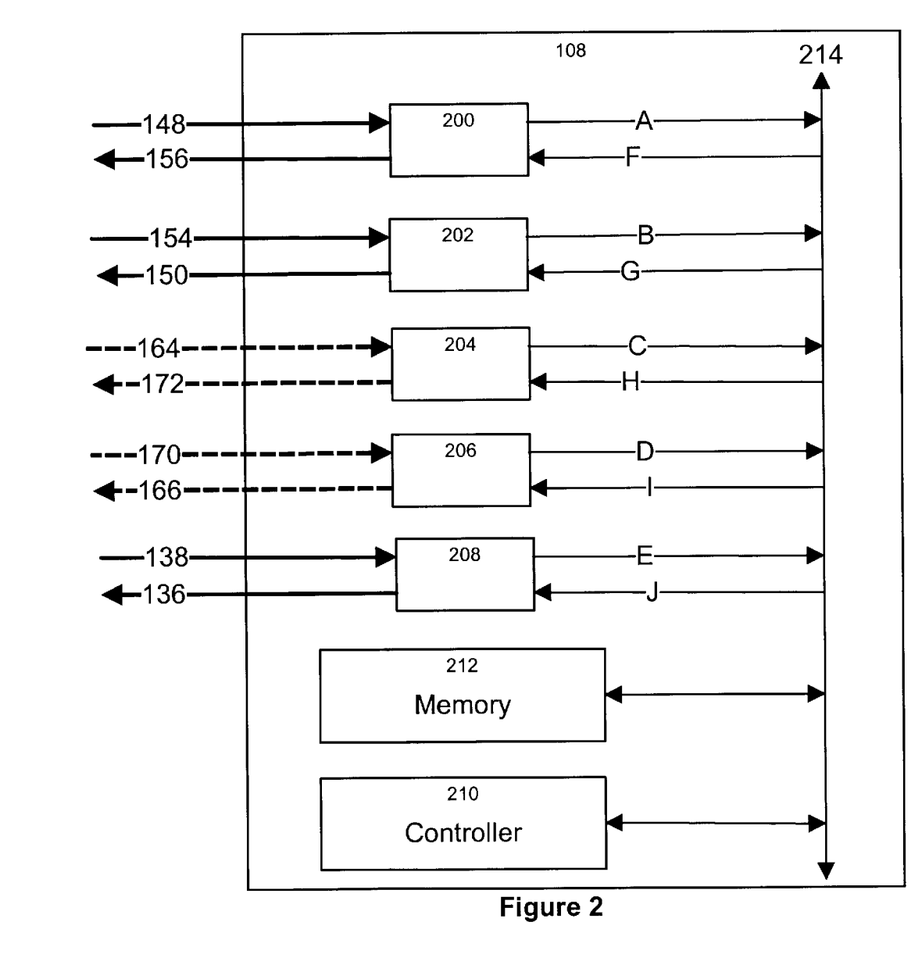
FIG. 2 is a block diagram of the structure of a switching node from the optical network shown in FIG. 1.

The general structure of an OC-192 switching node constructed in accordance with this invention is shown in FIG. 2, specifically switching node 108. Each transmission node within a SONET ring is a separate physical structure and, in practice, may be located between 80 and 100 kilometers from an adjacent transmission node. As seen in FIG. 2, switching node 108 is implemented on what is referred to as a switch card, the card comprised of interfaces 200, 202, 204, 206 and 208, a controller 210 and a memory 212. An internal system bus 214 interconnects these components, enabling data and control signals to be exchanged between them. The switching node has 10 ports, identified as ports A through J. Four of these ports connect the switching node to working paths 148, 154, 156 and 150, specifically input ports A and B and output ports F and G respectively, allowing data to be received from and passed to adjacent transmission nodes 106 and 110 within the ring 124. Another four of these ports connect the switching node to protection paths 164, 170, 172 and 166, specifically input ports C and D and output ports H and I respectively, ensuring that OC-192 node 108 supports both linear and ring protection. In general, the input ports are designed to receive data from their associated physical paths, while the output ports are designed to transmit data over their associated physical paths.

Each intra-ring send and receive pair of working paths, including the intra-ring secondary connection lines, is implemented by a fiber pair, while each intra-ring send and receive pair of protection paths is implemented by a separate fiber pair. These pairs should not be in the same fiber optic cable, as this would defeat the purpose of protection against cable breaks. Ports J and E connect the switching node to inter-ring lines 136 and 138 respectively, where these lines are also implemented by another fiber pair. These two ports form what is called the primary connection tributary, receiving data from, and transmitting data to, ring 126. Specific to this invention, such a tributary may support either the OC-12 or OC-48 level. For the sake of clarity, a single tributary is shown in FIG. 2; however, in practice, primary node 108 would include several such tributaries (where the number of tributaries is dependent on whether they support the OC-12 or OC-48 level), all inter-connecting with the primary node 118 of ring 126, over separate fiber pairs. For example, assuming that the tributaries for OC-192 primary node 108 are OC-48 tributaries, there would be 4 such tributaries, and consequently 4 pairs of OC-48 primary inter-ring send/receive connections, while in the case of OC-12 tributaries, there would be 16 such tributaries, and consequently 16 pairs of OC-12 primary inter-ring send/receive connections.

The interfaces 200, 202, 204, 206 and 208 interconnect the various input and output ports to their respective physical paths. These interfaces are responsible for the conversion of incoming optical signals into electrical signals, as well as for the transmission of these electrical signals to the internal system bus 214 for transport to the memory 212 where they can be processed by the controller 210. On the output side, the interfaces are also designed to accept outgoing electrical signals from the memory 212 through the system bus 214, and convert these electrical signals into optical signals prior to their release into the optical network. It is not deemed necessary to discuss the standard transmission and signal conversion operations of the interfaces in more detail because it is well known to those skilled in the art and is not critical to the success of the invention.

The memory 212 contains a program element that controls the operation of the switching node 108. This program element is comprised of individual instructions that are executed by the controller 210 that is in the form of a Central Processing Unit (CPU). The memory 212 further holds a routing table that maps the destination addresses of incoming data packets to the switching node 108 output ports. It is not deemed necessary to further discuss the structure of the routing table here because this component is not critical to the success of the invention and also it would be well known to a person skilled in the technological field to which the present invention belongs. In addition, the memory 212 provides random access storage, capable of holding data elements that the controller 210 manipulates during the execution of the program. For all transmission nodes within the SONET rings 124 and 126, the execution of the program element by the controller ensures standard data transmission and error/failure monitoring, including the multiplexing and de-multiplexing of optical signals as well as the support of both linear and ring protection. Such functionality is well-known to those skilled in the art and therefore will not be described in more detail. Specific to the present invention, the execution of the program element stored in the memory of OC-192 switching nodes 108 and 118 further ensures the handling and inter-ring transmission of optical signal concatenated payloads, as well as protection switching between SONET rings 124 and 126. The operation of this particular functionality of the primary node program element will be described in further detail below. The above structural description of a transmission node has the purpose of presenting certain components of such a transmission node, and is in no way intended to limit the scope of the present invention to just these components. The optical network transmission node could alternatively include additional components with various functionalities inherent to SONET transmission.

The controller 210 includes two functional sub-controller blocks, specifically a routing controller functional block (or simply "routing controller") and a switching controller functional block (or simply "switching controller"). The routing controller is responsible within the switching node 108 for routing an incoming intra-ring optical signal of block size 192 to adjacent network ring 126, via the inter-ring primary send connections, such as primary connection line 136. In order to do so, the routing controller first divides the incoming intra-ring OC-192 optical signal into either 4 optical signals of block size 48, or 16 optical signals of block size 12, dependent on the optical signal level supported by the switching node 108 tributaries. Following this division, the routing controller next observes the smaller size blocks one at a time and determines whether a particular block is to be transmitted to ring 126. Note that in the case where the block is not to be transmitted to ring 126, it is to be transmitted either to an external system or to another transmission node internal to ring 124. Specific to the case where a particular block is to be transmitted to ring 126, the routing controller reads the block's header section for a mark indicative of concatenated or non-concatenated data within the block's payload section. Note that this example assumes a single mark, identifying the concatenated or non-concatenated nature of the payload section as a single unit. If this mark indicates that the payload section includes concatenated data, the routing controller will route this data to the adjacent network ring as a single unit, via a particular primary inter-ring send connection, in this example primary send connection line 136. If, on the other hand, the mark indicates the absence of concatenated data, the routing controller will permit the block's payload to be routed to the adjacent network ring as independent data elements, via different primary inter-ring send connections. This implies that the different data elements, such as STS-1 level signals, will be examined separately and routed possibly through different connections. Further, the routing controller is responsible for implementing a dual transmission, whereby a copy of a particular optical signal of block size 12 or 48, being transmitted over a primary send connection to the adjacent ring, is multiplexed into an optical signal of block size 192 and routed towards the intra-ring secondary send connection 150. This copy provides a data backup in case a particular primary send connection, for example primary send connection 136, experiences a failure and one of the smaller size blocks divided out from an OC-192 optical signal is routed towards this particular primary send connection. Without the data backup, the smaller size block(s) routed towards the particular primary send connection would be lost. The routing controller functionality is implemented as software, specifically a part of the program element stored in the memory of the switching node.

The switching controller is responsible within the switching node 108 for monitoring the primary inter-ring receive connections for the presence of a failure, where such a failure could result in the loss of inter-ring data incoming from the adjacent ring 126. In the case where a failure is detected at a particular primary receive connection, for example primary receive connection 138, the switching controller will perform a protection switch, to be described below. In simple terms, the protection switch involves receiving the incoming inter-ring data from the intra-ring secondary receive connection 154, as opposed to the failed primary receive connection 138. Similar to the routing controller, the switching controller functionality is implemented as software, specifically a part of the program element stored in the memory of the switching node.

The protection switching functionality inherent to the OC-192 primary nodes 108 and 118, also implemented in software as a part of the program element stored in the switching node memory, is represented visually in FIG. 1 by four elements, specifically elements 128 and 130 in primary node 108, and elements 132 and 134 in primary node 118. Elements 128 and 132 will hereafter be referred to as Service Selectors, while elements 130 and 134 will hereafter be referred to as Drop and Continue Points. It is the combined functionality of both a Service Selector and a Drop and Continue Point within a primary node which allows for a secondary connection, or alternate route, to be established between two SONET rings, as required by protection switching. Within a primary node the Service Selector, implemented by the switching controller, is responsible for receiving the incoming data from another ring, selecting either the primary connection between the two rings or, in the case of an inter-ring failure of some sort, the working path from the appropriate adjacent secondary node. The Drop and Continue Point of a primary node, implemented by the routing controller, is responsible for backing-up any transmission made over the primary connection to another ring, whereby the same transmission is sent over a working path to the appropriate adjacent secondary node. Specific to this invention, within each switching node there is one Service Selector and one Drop and Continue Point for each primary inter-ring connection tributary. In the case where an OC-192 switching node includes 4 OC-48 tributaries, there would also be 4 Service Selectors and 4 Drop and Continue Points, each capable of processing a maximum of 48 STS-1 signals at a time. In the case where an OC-192 switching node includes 16 OC-12 tributaries, there would also be 16 Service Selectors and 16 Drop and Continue Points, each capable of processing a maximum of 12 STS-1 signals at a time.

Figure 3:
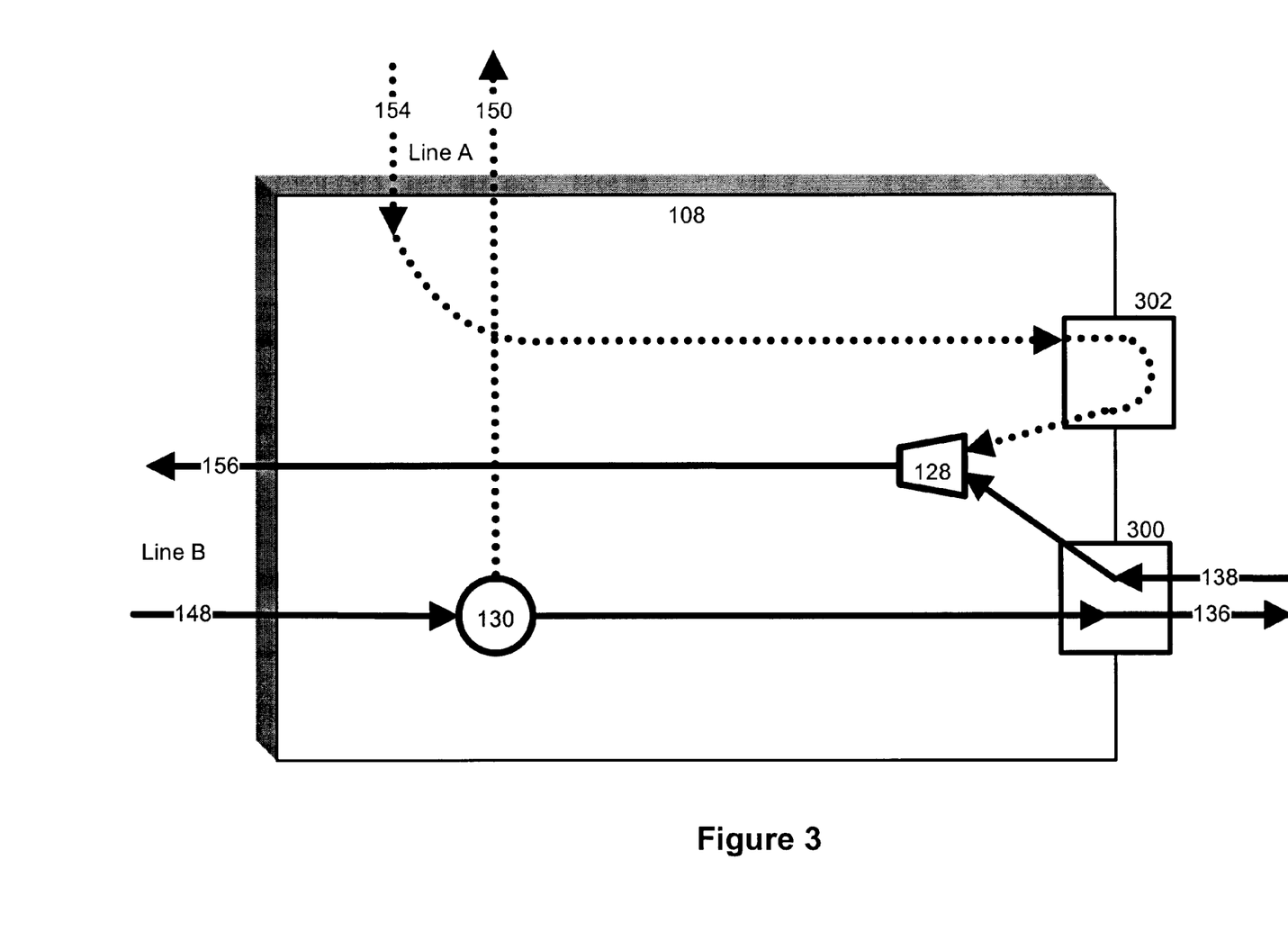
FIG. 3 is a functional block diagram of a primary switching node from the optical network shown in FIG. 1.

FIG. 3 is a functional representation of the data flow within primary node 108, specifically with respect to protection switching. The incoming primary inter-ring connection feed arrives on the incoming line 138, where the combination of the two inter-ring lines 136 and 138 are referred to as tributary 300. As described above, the primary inter-ring connection consists in either an OC-12 or OC-48 tributary, as protection switching is done at either of these two facility levels. This incoming primary feed is normally connected to path 156 of Line B, via the Service Selector 128. The secondary inter-ring connection feed is coming in via an alternate route between the two rings, specifically over path 154 of Line A. In order to align the protection switching as much as possible to OC-12/48 linear protection, where both a working and protection path is available, the secondary feed from path 154 is dropped, or transmitted from the primary node 108, at tributary 302. An external loopback connects the outgoing line of tributary 302 to the incoming line of tributary 302, which is also connected to the Service Selector 128. The tributary pair 300/302 therefore has incoming working traffic at tributary 300 and incoming protection traffic at tributary 302. If an inter-ring failure occurs and the working traffic arriving at tributary 300 is inaccessible, uni-directional protection switching occurs whereby the Service Selector 128 will select the protection traffic from tributary 302 for connection to path 156 of Line B. Specific to this invention, within each primary node there is one Service Selector for each primary inter-ring connection tributary. As mentioned above, for the sake of clarity primary node 108 includes only one such tributary, specifically tributary 300, and consequently a single Service Selector 128. However, in practice there could be four or sixteen such tributaries. In the case where primary node 108 includes 4 OC-48 tributaries, there would also be 4 Service Selectors, each capable of switching a maximum of 48 STS-1 signals at a time. In the case where primary node 108 includes 16 OC-12 tributaries, there would also be 16 Service Selectors, each capable of switching a maximum of 12 STS-1 signals at a time. The number of primary inter-ring connection tributaries within an OC-192 primary node also determines the number of Drop and Continue Points required within the same primary node.

The outgoing primary inter-ring connection feed arrives from path 148 of Line B via the Drop and Continue Point 130, where it is dropped and transmitted over line 136 of tributary 300. The feed from path 148 then continues over the connection to the outgoing path 150 of Line A. Therefore the protection of tributary 300's outgoing working line 136 is assured by the secondary inter-ring connection feed continuing over outgoing protection path 150. Similar to the above described Service Selectors, the number of primary inter-ring connection tributaries within a primary node determines the number of Drop and Continue Points required within the same primary node.

Figure 7:
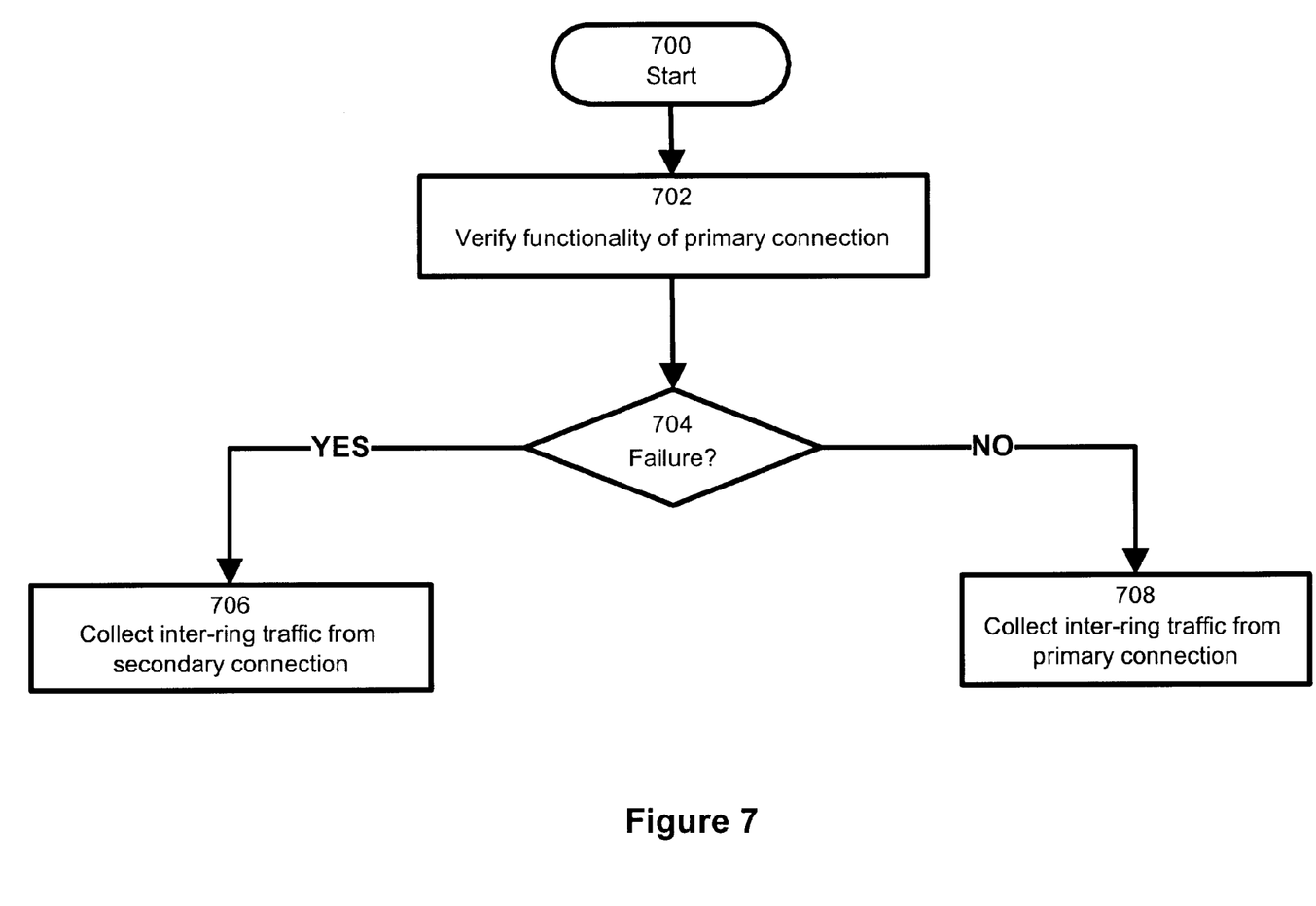
FIG. 7 is a flow chart illustrating the operation of a program element in the primary switching node depicted in FIGS. 1 and 3, which controls the protection switching functionality.

FIG. 7 provides a complete flowchart illustrating an example of the operation of the program element stored in the memory 212, and executed by the controller 210, that regulates the operation of the primary node 108, in particular its protection switching functionality. Continuing with the example of primary node 108, at step 702 the functionality of the node's primary inter-ring connection line is verified, specifically line 138 at input port E. This verification consists in constantly monitoring incoming line 138 for failures that indicate a loss of data. Examples of these failures are Loss of Signal, Loss of Pointer, Line Alarm and Path Alarm. These failures are reported in the SONET overhead, and they are the same failures that will cause a linear protection switch or a ring protection switch. In the case where this verification reports such a failure, a protection switch occurs and inter-ring traffic is collected from the secondary connection, specifically from input port B over working path 154, at step 706. In comparing to the above described visual example of FIG. 3, step 706 is the equivalent of the Service Selector 128 connecting the outgoing path of tributary 302, and therefore path 154 of Line A, to path 156 of Line B. No verification is be performed on line 136 since any transmission sent over line 136 at output port J is also sent over path 150 via output port G, used as a back-up in the case of a line 138 or primary node 118 failure. This double transmission was described above in the visual example of FIG. 3 by the Drop and Continue Point 130.

Figure 4:
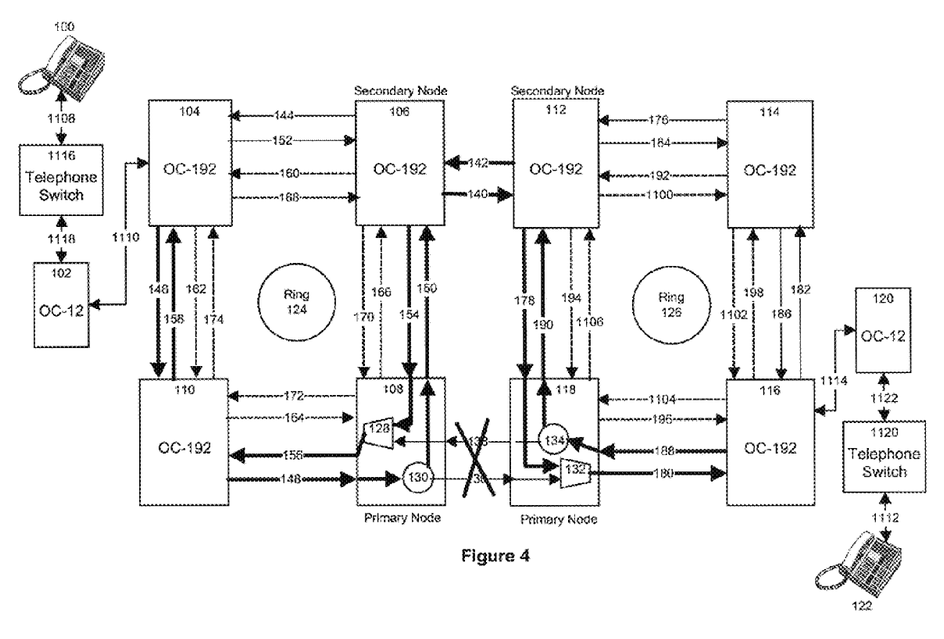
FIG. 4 is a block diagram depicting an example of protection switching in the case of a primary connection failure, for the optical network shown in FIG. 1.
Figure 5:
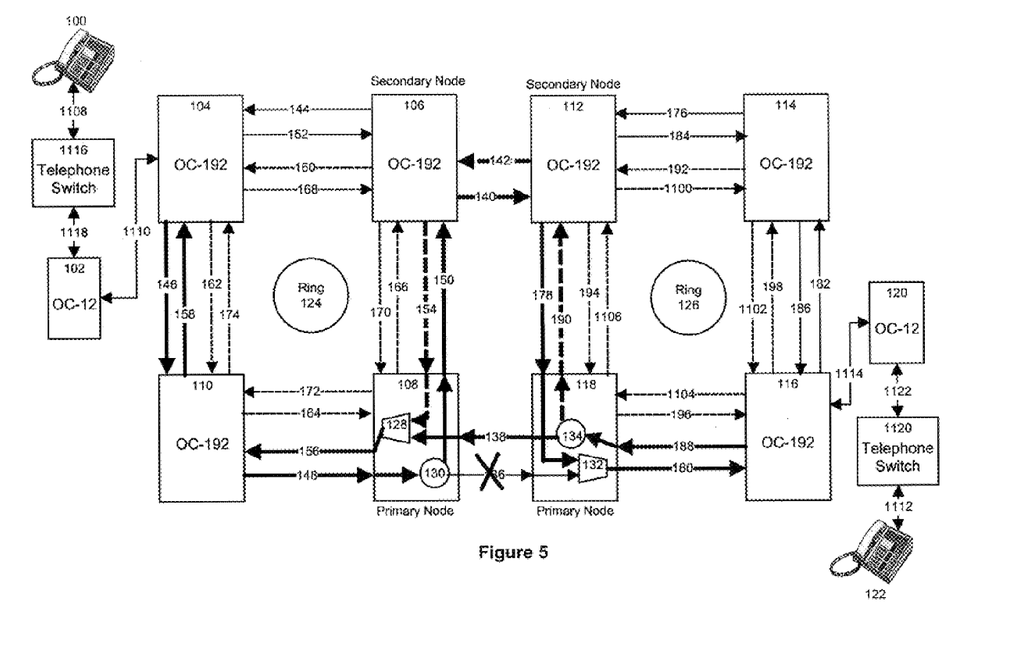
FIG. 5 is a block diagram depicting an example of protection switching in the case of a one-way primary connection failure, for the optical network shown in FIG. 1.
Figure 6:
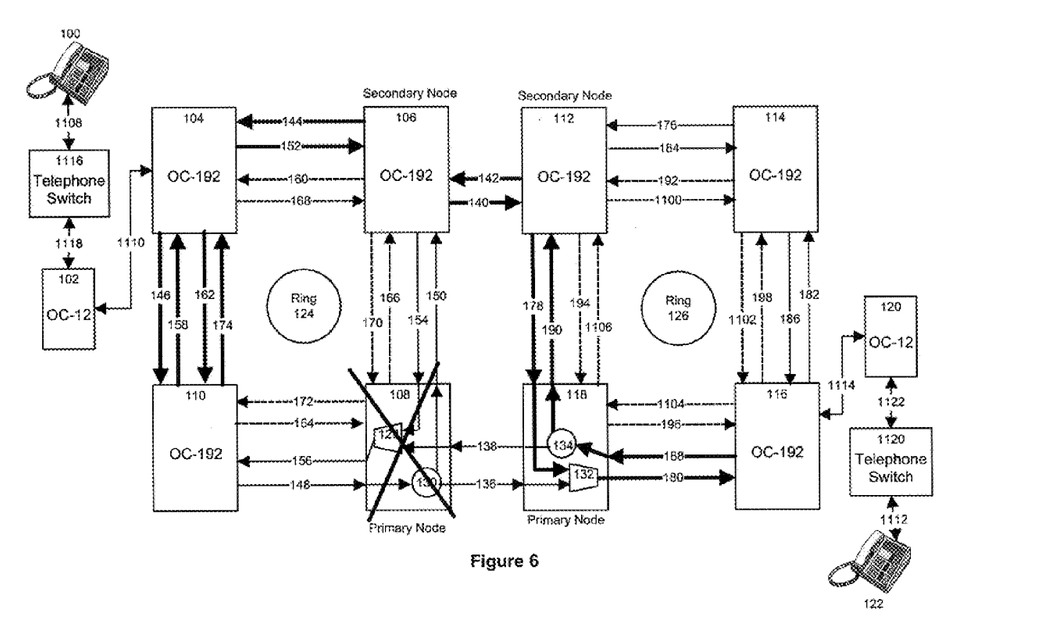
FIG. 6 is a block diagram depicting an example of protection switching in the case of a node failure, for the optical network shown in FIG. 1.

FIGS. 4, 5 and 6 depict examples of protection switching in accordance with a most preferred embodiment of the current invention, for different types of failures within the optical network shown in FIG. 1. Although the protection switching functionality is implemented by the program element stored in the memory, and executed by the controller, of the optical network primary nodes, as described above, the visual Drop and Continue Points and Service Selectors have been used in the following examples in the interest of clarity. In FIG. 4, a primary inter-ring connection failure has occurred, where both lines 136 and 138 are non-functional. In such a case, protection switching ensures a secondary inter-ring connection in both directions of traffic flow. Specifically the primary connection over line 136 is replaced by a secondary connection over paths 150, 140 and 178, via secondary nodes 106 and 112. Similarly, the primary connection over line 138 is replaced by a secondary connection over paths 190, 142 and 154, via secondary nodes 112 and 106.

In FIG. 5, a one-way primary inter-ring connection failure has occurred, where line 136 only is non-functional. Line 138 is functional and supports a primary connection for the transmission of inter-ring traffic from ring 126 to ring 124. However, a secondary connection replaces the non-functional line 136 primary inter-ring connection, specifically the connection over paths 150, 140 and 178, via secondary nodes 106 and 112. The secondary connection over paths 190, 142 and 154 still functions as an alternate route in case of a failure affecting line 138.

Note that an interesting feature of the present system is its fast recovery of inter-ring traffic in the case of inter-ring line failures. In prior art Matched Nodes systems, a hold-off time of 100 msec is applied before all protection switches are executed, whether an inter-ring line, inter-ring path or intra-ring path failure has occurred. It is preferred to apply this hold-off time in the case of path failures only. The hold-off time is necessary in the case of path failures because a primary node's Service Selector may detect a signal failure for a brief duration (up to 60 msec) while a subtending equipment does a protection switch, and may consequently execute an unnecessary protection switch. For example, if in FIG. 5 ring 124 executes a protection switch, taking at most 60 msec to complete, then this will be detected at the Service Selector 132 of node 118. Without a hold-off time, Service Selector 132 would itself also execute a protection switch, completely unnecessary because the signal in ring 124 will be restored once the ring 124 protection switch is complete. However, the hold-off time is not applied in the case of an inter-ring line failure, since a line failure indicates a primary inter-connection feed failure. Such a failure requires a protection switch in order to avoid loss of traffic, as it may not be corrected by a prior protection switch in any subtending equipment. Therefore, a line failure will result in a protection switch as soon as possible. This distinction between the different failures detected within the subtending equipment of an optical network, and the specific hold-off time applied as a result, allows for an overall faster recovery of inter-ring traffic, due to the faster switching time implemented in the wake of all detected line failures.

In FIG. 6, a node failure has occurred, specifically a failure of primary node 108, ruling out any use of the primary inter-ring connection over lines 136 and 138. In such a case, protection switching combined with ring protection offers a secondary connection between rings 124 and 126, in both directions of traffic flow. Traffic arriving at OC-192 node 110 over working path 146, for transmission to primary node 108, is re-routed back to OC-192 node 104 over protection path 174. The traffic is then sent over protection path 168 to secondary node 106, where transmission to ring 126 occurs over line 140, followed by further intra-ring forwarding. Similarly, traffic arriving at primary node 118 for transmission to ring 124 is sent over working path 190 to secondary node 112, where transmission to ring 124 occurs over the secondary inter-ring connection line 142, also followed by further intra-ring forwarding.

In another embodiment of the present invention, the secondary inter-ring connection can itself be protected through linear protection. In such a situation, another two protection lines would inter-connect secondary nodes 106 and 112, one of these protection lines used as a back-up for line 140, the other used as a back-up for line 142. However, in practice the secondary connection is not often protected as it is only a back-up connection. Also, within an optical network, the secondary nodes of two rings are often co-located, and the chance of a break in the secondary connection is highly unlikely.

The above description of a preferred embodiment under the present invention should not be read in a limitative manner as refinements and variations are possible without departing from the spirit of the invention. The scope of the invention is defined in the appended claims and their equivalents.

We claim:

1. A switching node for use in a synchronous optical network ring transporting data divided into first size blocks, said switching node including:

a plurality of primary receive connections for receiving inter-ring optical signals divided into second size blocks, where a second size block is smaller than a first size block, a second size block including a header section and a payload section, the header section including a mark related to at least a portion of the payload section, the mark being indicative as to whether the portion of the payload section is concatenated data or non concatenated data, when the portion of the payload section is non concatenated data it includes a plurality of independent data elements;

a plurality of primary send connections for transmitting inter-ring optical signals divided into second size blocks;

a secondary receive connection for receiving intra-ring optical signals divided into first size blocks;

a secondary send connection for transmitting intra-ring optical signals divided into first size blocks;

a main controller for routing of first size blocks towards the primary send connections, said main controller being operative to:
  a) divide an incoming first size block into at least two second size blocks;
  b) observe the mark in the header section of a second size block to determine whether the payload section of the second size block includes concatenated data and acquiring either one of two data transmission modes in dependence of the mark;
    i) If the mark is indicative of presence of concatenated data in the payload section of the second size block, said main controller acquires a first data transmission mode where the concatenated data is routed as a single unit towards a particular primary send connection; and
    ii) If the mark is indicative of absence of concatenated data in the payload section of the second size block, said main controller acquires a second data transmission mode permitting routing of independent data elements contained in the payload section of the second size block towards different primary send connections.

2. A switching node as defined in claim 1, wherein said switching node further includes a program element executable with a Central Processing Unit to implement the functionality of said main controller.

3. A switching node as defined in claim 2, wherein said main controller implements a routing controller function invoked prior to the transmission of a second size block over a particular primary send connection to make a copy of the second size block and direct the copy of the second size block towards the secondary send connection to provide a data backup in case the particular primary send connection experiences a failure.

4. A switching node as defined in claim 3, wherein said main controller implements a switching controller function to monitor a particular primary receive connection for the presence of a failure.

5. A switching node as defined in claim 4, wherein said switching controller function performs a protection switch event when a failure is detected at said particular primary receive connection, the protection switch event being characterized by reception of inter-ring data by said switching node from said secondary receive connection instead of from a particular primary receive connection.

6. A switching node as defined in claim 5, wherein the failure is a path failure or a node failure.

7. A switching node as defined in claim 6, wherein said switching controller function applies a hold-off time of 100 ms after the detection of the failure before performing the protection switch event.

8. A switching node as defined in claim 5, wherein the failure is an inter-ring line failure.

9. A switching node as defined in claim 8, wherein the switching controller function performs a protection switch event immediately after the detection of the inter-ring line failure.

10. A switching node as defined in claim 1, wherein the first size block corresponds to an OC-192 facility level optical signal.

11. A switching node as defined in claim 1, wherein the second size block corresponds to an OC-12 or to an OC-48 facility level optical signal.

12. A method for managing the transmission of optical signal concatenated payloads in a switching node of a synchronous optical network ring transporting data divided into first size blocks, said switching node including:

a plurality of primary receive connections for receiving inter-ring optical signals divided into second size blocks, where a second size block is smaller than a first size block, a second size block including a header section and a payload section, the header section including a mark related to at least a portion of the payload section, the mark being indicative as to whether the portion of the payload section is concatenated data or non concatenated data, when the portion of the payload section is non concatenated data it includes a plurality of independent data elements;

a plurality of primary send connections for transmitting inter-ring optical signals divided into second size blocks;

a secondary receive connection for receiving intra-ring optical signals divided into first size blocks;

a secondary send connection for transmitting intra-ring optical signals divided into first size blocks;

said method comprising the steps of:
  a) receiving an incoming first size block;
  b) dividing said first size block into at least two second size blocks, where a second size block includes a header section and a payload section;
  c) processing a second size block to determine whether the payload section of said second size block includes concatenated data;
  d) routing the second size block towards an adjacent optical network ring in dependence of the presence of concatenated data, if there is presence of concatenated data said concatenated data is routed as a single unit towards a particular primary inter-ring connection, if there is absence of concatenated data the data contained in said payload section of the second size block may be routed as independent data elements towards different primary inter-ring connections.

13. A method as defined in claim 12, including the step of routing a copy of the second size block towards said secondary send connection.

14. A method as defined in claim 13, including the step of monitoring a particular primary receive connection for the presence of a failure.

15. A method as defined in claim 14, including the step of performing a protection switch event when a failure is detected over said particular primary receive connection, the protection switch event being characterized by reception of inter-ring data by the switching node from said secondary receive connection instead of from said particular primary receive connection.

16. A method as defined in claim 15, wherein the failure is a path failure or a node failure.

17. A method as defined in claim 16, including the step of applying a hold-off time of 100 ms after the detection of the failure before performing the protection switch.

18. A method as defined in claim 15, wherein the failure is an inter-ring line failure.

19. A method as defined in claim 18, including the step of performing a protection switch immediately after the detection of the inter-ring line failure.

20. A method as defined in claim 12, wherein the first size block corresponds to an OC-192 facility level optical signal.

21. A method as defined in claim 12, wherein the second size block corresponds to an OC-12 or to an OC-48 facility level optical signal.

* * * * *

UNITED STATES PATENT AND TRADEMARK OFFICE
CERTIFICATE OF CORRECTION

PATENT NO. : 6,147,968
DATED : November 14, 2000
INVENTOR(S) : De Boer et al.

It is certified that error appears in the above-identified patent and that said Letters Patent are hereby corrected as shown below:

Lead inventor's last name should be "de Boer" instead of "De Moer"

THIS CORRECTION APPLIES TO BOTH THE ORIGINAL LETTERS PATENT AND THE ELECTRONIC VERSION STORED IN THE PATENT DATABASE OF THE U.S. PATENT AND TRADEMARK OFFICE.

Signed and Sealed this

Eighth Day of May, 2001

*Attest:*

NICHOLAS P. GODICI

*Attesting Officer*  Acting Director of the United States Patent and Trademark Office